United States Patent
Nordquist et al.

[11] Patent Number: 5,847,535
[45] Date of Patent: Dec. 8, 1998

[54] ACTIVE ELECTRONIC DAMPING FOR STEP MOTOR

[75] Inventors: Jack Nordquist, Santa Rosa; Mark C. Calahan, Sebastopol; Timothy J. Damiano, Petaluma; Christopher M. Botka, Santa Rosa, all of Calif.

[73] Assignee: Parker-Hannifin Corporation, Cleveland, Ohio

[21] Appl. No.: 787,457

[22] Filed: Jan. 22, 1997

Related U.S. Application Data

[60] Provisional application No. 60/010,862 Jan. 31, 1996.

[51] Int. Cl.[6] ........................................ H02P 1/46
[52] U.S. Cl. .................. 318/700; 318/696; 318/685; 318/798-815; 318/455; 318/438; 318/650
[58] Field of Search ................. 318/700, 696, 318/685, 798–815, 455, 438, 650

[56] References Cited

U.S. PATENT DOCUMENTS

| | | | |
|---|---|---|---|
| 3,836,835 | 9/1974 | Sawyer | 318/685 |
| 3,863,118 | 1/1975 | Lander et al. | 318/685 |
| 3,875,508 | 4/1975 | Milkovic | 318/700 X |
| 3,890,514 | 6/1975 | Mutz et al. | 310/49 |
| 3,940,676 | 2/1976 | Dudley | 318/612 |
| 3,965,406 | 6/1976 | Yablonski | 318/696 |
| 4,049,985 | 9/1977 | Sudler | 310/49 R |
| 4,078,189 | 3/1978 | Nash et al. | 318/700 X |
| 4,078,191 | 3/1978 | Morters et al. | 318/700 X |
| 4,091,316 | 5/1978 | Friedman | 318/696 |
| 4,286,202 | 8/1981 | Clancy et al. | 318/696 |
| 4,329,633 | 5/1982 | Dunfield | 318/612 |
| 4,329,635 | 5/1982 | Reilly | 318/696 |
| 4,349,770 | 9/1982 | Ragen | 318/685 |
| 4,414,497 | 11/1983 | Song | 318/696 |
| 4,455,512 | 6/1984 | Cornwell et al. | 318/135 |
| 4,458,227 | 7/1984 | Petersen | 335/222 |
| 4,484,124 | 11/1984 | White et al. | 318/696 |
| 4,507,598 | 3/1985 | Wakabayashi et al. | 318/687 |
| 4,510,429 | 4/1985 | Squire | 318/696 |
| 4,518,904 | 5/1985 | MacLeod et al. | 318/685 |
| 4,536,690 | 8/1985 | Belsterling et al. | 318/687 |
| 4,584,495 | 4/1986 | Kordik | 310/49 R |
| 4,618,808 | 10/1986 | Ish-Shalom et al. | 318/696 |
| 4,658,194 | 4/1987 | Richter et al. | 318/696 |
| 4,958,115 | 9/1990 | Miller | 318/662 |
| 5,105,368 | 4/1992 | Alexandersen et al. | 395/89 |
| 5,140,162 | 8/1992 | Stettner | 250/370.09 |
| 5,189,356 | 2/1993 | Rovner | 318/685 |
| 5,349,522 | 9/1994 | Konishi et al. | 363/95 |

*Primary Examiner*—Karen Masih
*Attorney, Agent, or Firm*—Calfee, Halter & Griswold LLP

[57] ABSTRACT

Apparatus for electronically producing a torque dependent signal for a plural drive phase synchronous step motor, without the use of an accelerometer or other external feedback device, includes a circuit for detecting respective instantaneous terminal voltage signals for at least two phases of the motor; another circuit for detecting respective instantaneous phase current signals for said at least two phases; and a signal processing circuit for combining the detected signals to produce said torque dependent signal.

20 Claims, 6 Drawing Sheets

ACTIVE ELECTRONIC DAMPING FOR STEP MOTOR

BACKGROUND OF THE INVENTION

This application is related to United States provisional patent application Ser. No. 60/010,862 for "PASSIVE ELECTRONIC DAMPING FOR STEP MOTOR" filed on even date herewith, the entire disclosure of which is fully incorporated herein by reference.

The invention relates generally to drive control techniques for synchronous motors such as plural drive phase step motors. More particularly, the invention relates to an active electronic damping technique for such motors.

The general design and operation of a step motor, such as a hybrid permanent magnet synchronous step motor, are well-known. A hybrid rotary machine typically includes a cylindrical rotor which is axially magnetized by an embedded permanent magnet. The rotor is further configured with a number of teeth; commonly fifty teeth are used but other teeth quantities can be selected depending on the particular application requirements. The present invention, however, can also be used with other types of synchronous machines and motors, for example, linear step motors.

Step motor designs also include a stator having a number (typically but not limited to eight) of electromagnetic pole faces which are spaced around the rotor at selected intervals. Each stator pole face presents a toothed pattern to the rotor. When the electromagnets are energized, the induced electromagnetic flux adds to and subtracts from the permanent magnet flux at the various pole faces depending on the rotational position of the rotor. This results in an alignment of the rotor teeth with the stator teeth in stable torque equilibrium at whichever pole faces are carrying the most flux across the rotor-stator gap.

Motion is achieved and maintained by continuously sequencing the electromagnet currents so as to move the location of the stable equilibrium in one direction or another. Torque is developed through a mutual interaction of electromagnet excitation and permanent magnet flux crossing the toothed interface between the rotor and stator. In a typical two phase motor, the stator electromagnet windings are grouped into two phases (A and B) and are driven by currents that are in temporal quadrature (the phase A and phase B currents are 90° out of phase with respect to each other). If a particular combination of: electromagnetic drive currents (excitation state) is maintained in the various windings, the motor will seek and attempt to hold a particular position due to the presence of a stable torque detent. If the excitation state is changed the rotor is urged to a new position by the resultant torque.

Sustained motion is achieved by continuously sequencing the phase currents through a prearranged set of states. In a typical system, one electrical cycle of the phase currents moves the location of the torque equilibrium through an angle corresponding to one tooth interval. In their aggregate effect, the phase currents represent to the motor a reference position input consisting of a desired position plus an instantaneous position feedback offset.

The rotor attempts to seek the reference position (torque equilibrium or net zero torque condition) as if it were attached to the command by a spring which exerts a restoring torque when the rotor is not at the reference position. Motion or position of the rotor can be analogized to and exhibits the dynamics of a moment of inertia attached to the commanded position by a torsion spring. The stiffness of the "spring" is approximately proportional to the peak phase currents. Such a system, when operated in an uncompensated open-loop mode, exhibits a natural resonance that causes the motor to ring violently in response to step commands. The motor is also inordinately responsive to cyclic torque disturbances that occur in the vicinity of this natural resonance frequency.

Although a step motor system will have an intrinsic damping ratio arising from native viscous losses within the motor, drive and any external mechanical system attached to the motor shaft, the intrinsic damping ratio is typically very small and negligible in its effect to reduce the natural uncompensated resonance of the motor.

Since the natural resonance of a motor is typically an undesirable operational characteristic, efforts have been directed to increase the damping ratio by either mechanical means or the use of feedback techniques. For example, viscous friction can be mechanically increased in the motor but at the expense of impeding motor velocity and responsiveness. In a typical feedback arrangement, a feedback signal is obtained using an accelerometer mounted on the output shaft. This signal is then used to adjust the command in an attempt at reducing resonant behavior. Such devices are expensive and rather delicate, yet must be mounted to the rotating shaft (moving reference frame) and communicate with electronics on the stator or other stationary reference frame.

The objectives exist, therefore, to provide apparatus and methods for producing a signal related to torque, and consequently acceleration of the rotor, without the use of an accelerometer or other feedback device and incorporating that signal into a control system of a step motor in order to increase damping of the motor's natural resonant behavior and transient response.

SUMMARY OF THE INVENTION

In response to the aforementioned problems and objectives the invention contemplates, in one embodiment apparatus for electronically producing a torque dependent signal for a plural drive phase synchronous step motor. The apparatus includes a circuit that detects respective instantaneous terminal voltage signals for at least two phases of the motor, and a circuit that detects respective instantaneous phase current signals for said at least two phases. The apparatus also includes a signal processing circuit that combines the detected voltage and current signals to produce a torque dependent signal. In one embodiment the signal processing circuit determines respective generator currents by integrating the corresponding voltage signals for each phase and subtracting the corresponding phase current signal.

The present invention also contemplates the methods embodied in the use of such apparatus, as well as a method for electronically producing a torque dependent signal for a plural drive phase synchronous step motor, wherein the method includes the steps of a) detecting respective instantaneous terminal voltage signals for at least two phases of the motor; b) detecting respective instantaneous phase current signals for the two phases; and c) combining the detected signals to produce a torque dependent signal. In particular with respect to one embodiment, the method includes the step of integrating the phase voltage signals and subtracting the corresponding current signal to produce a generator current signal.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
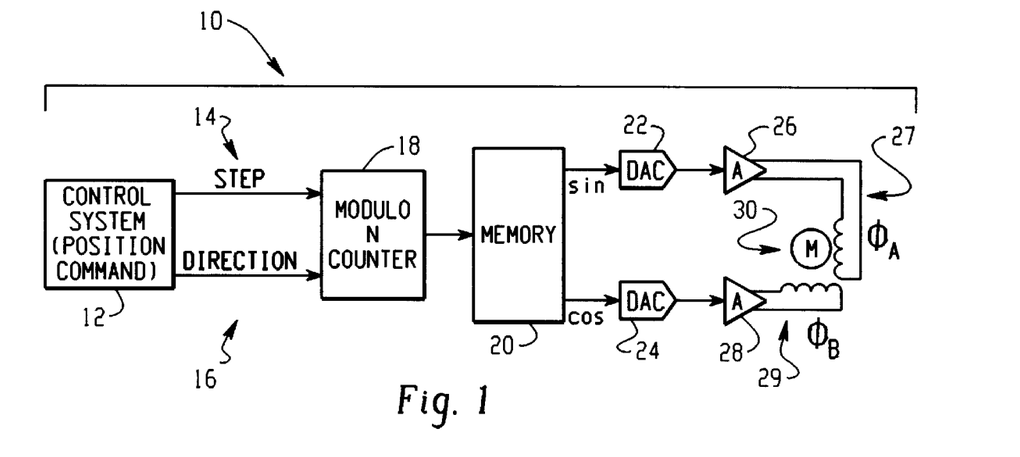
FIG. 1 is a simplified schematic in block diagram form of a control system for a two phase step motor suitable for use with the present invention.

With reference to FIG. 1, the fundamental elements of a control system 10 including a step motor 30 and drive circuits are shown in block diagram form. While the present invention is illustrated and described herein with reference to a rotary stepper type motor, this is for the purpose of illustration and explanation and should not be construed in a limiting sense. Those skilled in the art will readily appreciate that the invention can be used with different motor and machine designs, including but not limited to linear step motors. From a hardware component standpoint, these elements are well-known and familiar to those skilled in the art. A main controller or host system 12 commands the drive to increment or decrement the motor position $\ominus$ via step command signal 14 and direction signal 16. The drive accumulates these incremental commands in an up/down modulo N counter 18. For example, for a two phase 1.8° step motor system with a rotor having 50 teeth and employing 40 microsteps per tooth interval, the counter 18 would have a modulus of 40 (2000 microsteps per one rotor revolution). The state of the counter 18 is utilized to "look up" the sine and cosine values for the drive currents used in the two phases of the motor. These values are stored conveniently in a memory 20 such as, for example, a read only memory. The digital sine and cosine signals are input to respective digital to analog converters (DACs) 22, 24 which produce analog current commands to respective transconductance amplifiers 26, 28. The transconductance amplifiers 26, 28 maintain the commanded currents in the phase A and phase B windings 27, 29 of the motor 30. Dynamically, these phase currents cause a torque imbalance which moves the torque detent to the commanded position thus producing the desired rotation of the rotor to the new position.

In such a system 10, the phase A and B drive currents represent to the motor a single reference input, r(t), which is the desired position θ(t) plus the feedback offset Φ(t), or:

$$r(t)=\theta(t)+\Phi(t) \quad \text{Eq. 1}$$

The rotor attempts to seek the reference position as if it were attached to it by a spring which exerts restoring torque when the rotor is not at the reference position. The stiffness of this spring effect is approximately proportional to the magnitude of phase winding current $I_{max}$ up to a level where the electromagnet poles begin to enter magnetic saturation. In the preferred embodiment, $I_{max}$ is maintained sufficiently below that saturation level so that the electromagnetic circuit remains substantially linear. Under these conditions, the output position, c(t), of the rotor exhibits the dynamics of a moment of inertia which is attached to the commanded position by a torsion spring. Such a system has the transfer ratio $$\frac{C(s)}{R(s)} = \frac{(\omega_n)^2}{s^2 + 2\zeta_0\omega_n s + (\omega_n)^2} \quad \text{Eq. 2}$$

where $\omega_n$ is the undamped, natural angular velocity determined by the square root of the ratio of stiffness to the polar moment of inertia and $\zeta_0$ is the intrinsic damping ratio arising from native, viscous losses within the motor, drive and external mechanical system attached to the motor shaft.

Without resorting to extraordinary mechanical means, $\zeta_0$ may be as low as 0.01. Such a value is so low as to be negligible in most practical applications. According to an important aspect of the invention, a damping ratio of about 0.3 to 0.5 is produced by electronic means without the need for accelerometers or similar devices.

Neglecting $\zeta_0$ the block diagram form for the uncompensated (open loop) motor can be represented as shown by the following transfer ratio:

$$\frac{C(s)}{R(s)} = \frac{(\omega_n)^2}{s^2 + (\omega_n)^2} \quad \text{Eq. 3}$$

Such a system rings violently and persistently in response to step discontinuities in r(t) or any of its derivatives. Furthermore, the system is inordinately responsive to any cyclic torque disturbances that occur in the spectral vicinity of $\omega_n$. Consequently, the uncompensated motor tends to superimpose a relentless vibration on an otherwise smooth command.

Figure 2:
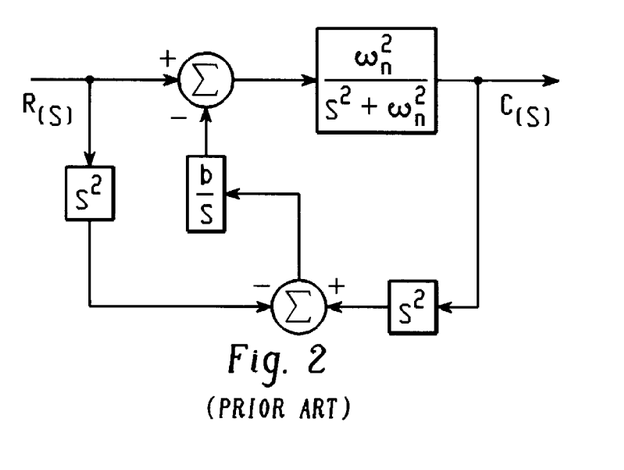
FIG. 2 is a transfer ratio diagram for a conventional step motor feedback damping arrangement.

The damping ratio, $\zeta$, can be increased by the feedback topology of FIG. 2. Such feedback techniques are well-known and have been applied to other classical resonant systems as well. The feedback signal is obtained from an electromechanical accelerometer mounted on the motor output shaft (not shown).

The present invention overcomes the disadvantages of such prior systems by obtaining acceleration feedback by electronic means, thereby obviating the need for an accelerometer or other external feedback device.

Figure 3:
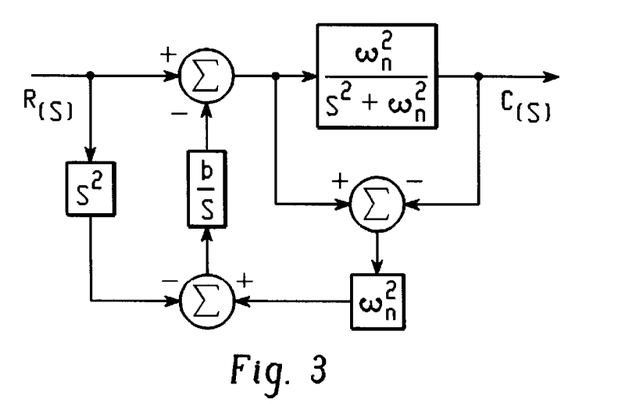
FIG. 3 is a transfer ratio diagram for a feedback damping control in accordance with the invention.

Using block diagram algebra, the arrangement of FIG. 2 can be redrawn as shown in FIG. 3.

In FIG. 3, we have redrawn the structure of FIG. 2 so as to render the same transfer ratio. The version in FIG. 3 depends, however, upon measuring the disequilibrium between the rotor position and the position commanded by the instantaneous distribution of phase currents. It is this disequilibrium that can be discerned from observing the instantaneous states of voltage and current in the various drive phases.

An advantage of the invention is that the observer matrix consists of relatively inexpensive electronic circuitry which can be conveniently included with the transconductance amplifiers 26 and 28 rather than an expensive and delicate rotational accelerometer mounted on the rotating motor shaft.

When the motor 30 is operated at shaft angular velocity, $\omega_e$, the variable reluctance at the various pole faces results in the commutation of permanent magnet flux through the various pole nieces in turn and therefore induces a seat of EMP (Electro-Motive-Force) in the phase windings (i.e. the motor also acts as a generator). The induced voltage is substantially sinusoidal having angular frequency $$\omega_e = K\omega_s$$

where K is the rotor tooth count, and generator voltage $$V_{gen} = \omega_3 \lambda$$

where $\lambda$ is the magnitude of the cyclic component of permanent magnet flux linking the windings of a phase. Each winding possesses a self inductance, L, which is essentially constant and independent of shaft position and the state of tooth alignment. The drive imposes a sinusoidal potential with amplitude, V, and angular frequency, $\omega_e$, across the motor terminals. It will be understood by those skilled in the art that the method by which the drive applies the sinusoidal voltage, e.g., linear or switchmode amplifier, can be selected based on the specific application requirements, and presents no limitation on the efficacy, applicability or form of the present invention. The presence of a pulse width modulated carrier component and attendant sidebands (present in the switchmode amplifier) also does not impinge on the operation of the invention except that provision may be made to filter such activity from the feedback signal produced by the observer matrix.

For motion (of the exemplary two phase embodiment described herein) in the positive direction, we identify Phases A and B so that all activity, voltage or current, which occurs in Phase A also occurs in Phase B delayed by ¼ of an electrical cycle. This relationship is depicted in FIG. 4.

Power is exchanged with the rotor via the product of current and voltage in the generators of each phase A and B. Inasmuch as the inductances remain constant, they do not participate in the transfer of net average power to or from the rotor.

Figure 4:
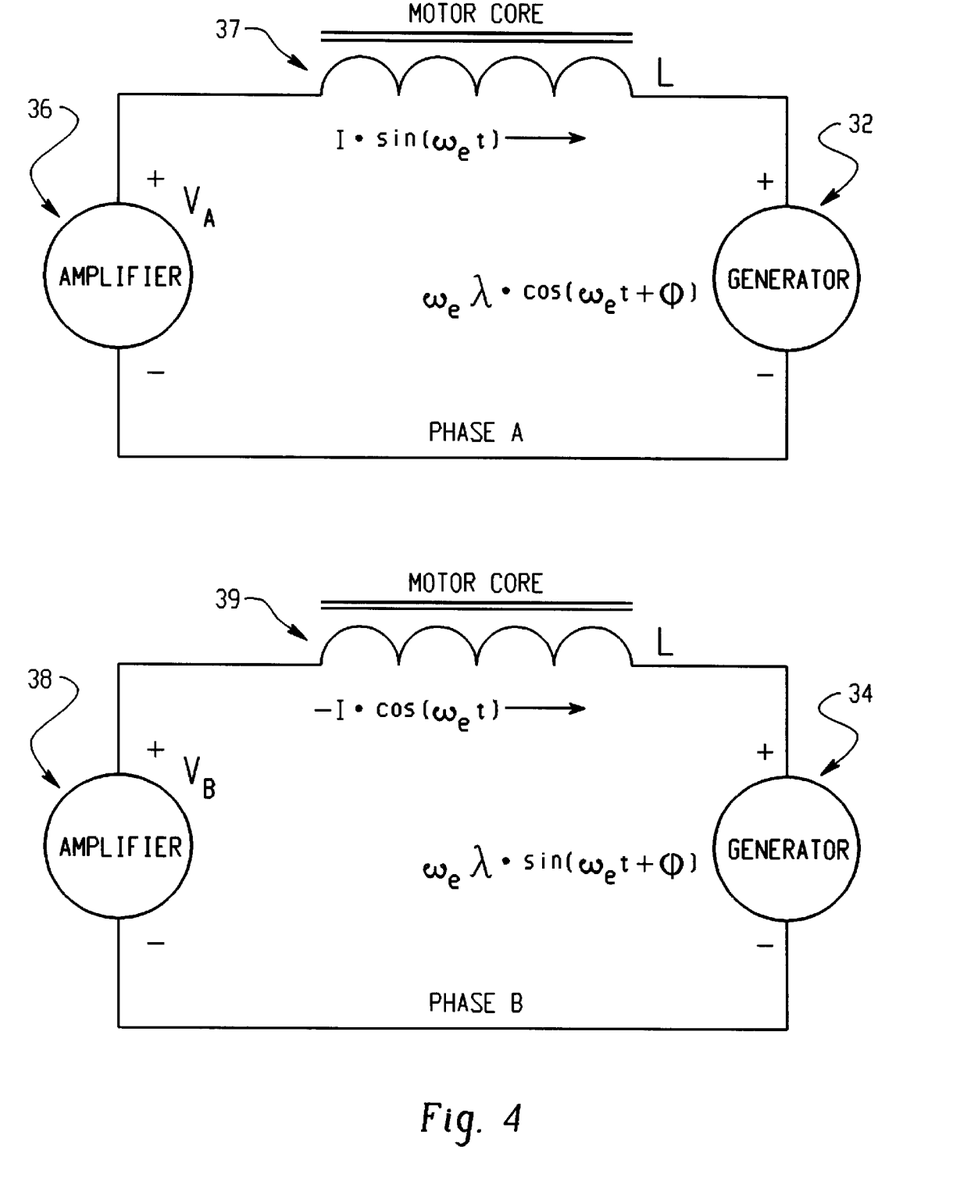
FIG. 4 is a representative schematic of phase voltages and currents for a two phase step motor.

Considering Phase A in FIG. 4, it is apparent that the instantaneous power entering the generator 32 is the product $$P_A = I \sin(\omega_e t) \omega_e \lambda \cos(\omega_e t + \Phi) \qquad \text{Eq. 4}$$

Similarly, Phase B power entering the generator 34 is:

$$P_B = I \cos(\omega_e t) \omega_e \lambda \sin(\omega_e t + \Phi) \qquad \text{Eq. 5}$$

Addition of equations 4 and 5 gives the total power $$P_{total} = I\omega_e \lambda \begin{pmatrix} \sin(\omega_e t)\cos(\omega_e t + \phi) - \\ \cos(\omega_e t)\sin(\omega_e t + \phi) \end{pmatrix} \qquad \text{Eq. 6}$$

$$= -I\omega_e \lambda \sin(\phi)$$

Torque, T, is the ratio of shaft power to angular velocity, or $$T = -\frac{I\omega_e \lambda}{\omega_e} \sin(\phi) = -I\lambda K \sin(\phi) \qquad \text{Eq. 7}$$

where K is the rotor tooth count.

The formulation in Eq. 7 is commonly referred to as the operating detent torque wave. It is a sinusoid with negative going zero crossing at $\Phi = 0$.

In one embodiment, the magnitude of the phase currents may be selected to be approximately $$I \approx 3 \frac{\lambda}{L}$$

so that Eq. 7 becomes $$T = -\frac{3\lambda^2 K}{L} \sin(\phi) \qquad \text{Eq. 8}$$

The instantaneous value of acceleration is then related to the instantaneous value of $\Phi$ by $$\alpha = \frac{T}{J} = -\frac{3\lambda^2 K}{JL} \sin(\phi) \qquad \text{Eq. 9}$$

where J is the total inertia of the mechanical system. The purpose of the observer matrix is to obtain electronically a signal which is proportional to $\sin(\Phi)$ and can be scaled to match $\alpha$.

In maintaining the commanded currents in the respective phase windings 37, 39, the drive amplifiers 36, 38 operate to produce the proper voltages to overcome the reactance, $\omega_e L$, and the generator voltage, $\omega_e \lambda$, so that the terminal voltages are $$V_A = \omega_e \lambda [3 \cos(\omega_e t) + \cos(\omega_e t + \Phi)] \qquad \text{Eq. 10}$$

$$V_B = \omega_e \lambda [3 \sin(\omega_e t) + \sin(\omega_e t + \Phi)]$$

The observation process begins by separately integrating both of the expressions in Eq. 10 using a convenient integrator gain, $\beta$.

$$\beta \eta V_A dt = \beta \lambda [3 \sin(\omega_e t) + \sin(\omega_e t + \Phi)] \qquad \text{Eq. 11}$$

$$\beta \eta V_B dt = -\beta \lambda [3 \cos(\omega_e t) + \cos(\omega_e t + \Phi)]$$

The values of the integrals in Eq. 11 are intermediate results which will be used twice. The first step is to divide them both by $\beta L$ and subtract the respective phase currents; giving the currents being produced by the motor's generators as follows $$I_{GenA} = \frac{1}{L} \int V_A dt - \frac{3\lambda}{L} \sin(\omega_e t) = \frac{\lambda}{L} \sin(\omega_e t + \phi) \qquad \text{Eq. 12}$$

$$I_{GenB} = \frac{1}{L} \int V_B dt - \frac{3\lambda}{L} \cos(\omega_e t) = -\frac{\lambda}{L} - \cos(\omega_e t + \phi)$$

Next, the antiderivatives in Eq. 11 are used again with the results in Eq. 12 to form the following sum of products $$I_{GenA} \cdot \beta \int V_E dt - I_{GenB} \cdot \beta \int V_A dt = \qquad \text{Eq. 13}$$

$$\frac{3\lambda^2 \beta}{L} \begin{bmatrix} \sin(\omega_e t)\cos(\omega_e t + \phi) - \\ \cos(\omega_e t)\sin(\omega_e t + \phi) \end{bmatrix} = \frac{3\lambda^2 \beta}{L} \sin(-\phi) = -\frac{3\lambda^2 \beta}{L} \sin(\phi)$$

The result in Eg. 13, which in one embodiment is the outout of the observer, has the notable property that it differs from the right side of Eg. 9, acceleration, by a simple constant $$\frac{J\beta}{K} \qquad \text{Eq. 14}$$

Thus, for a given application, the conversion gain of the observer must undergo a final scaling adjustment in proportion to the ratio defined in Eq. 14. This scale factor requires knowledge of only the integrator gain, $\beta$, tooth count, K, and the total inertia, J. It does not incorporate motor parameters such as current or inductance. Inductance was used inside the observer, Eq. 12. The output of the observer is, then, an accurate analog of the actual acceleration which can then be compared with the intended acceleration from the indexing hardware to obtain acceleration error.

Figure 5:
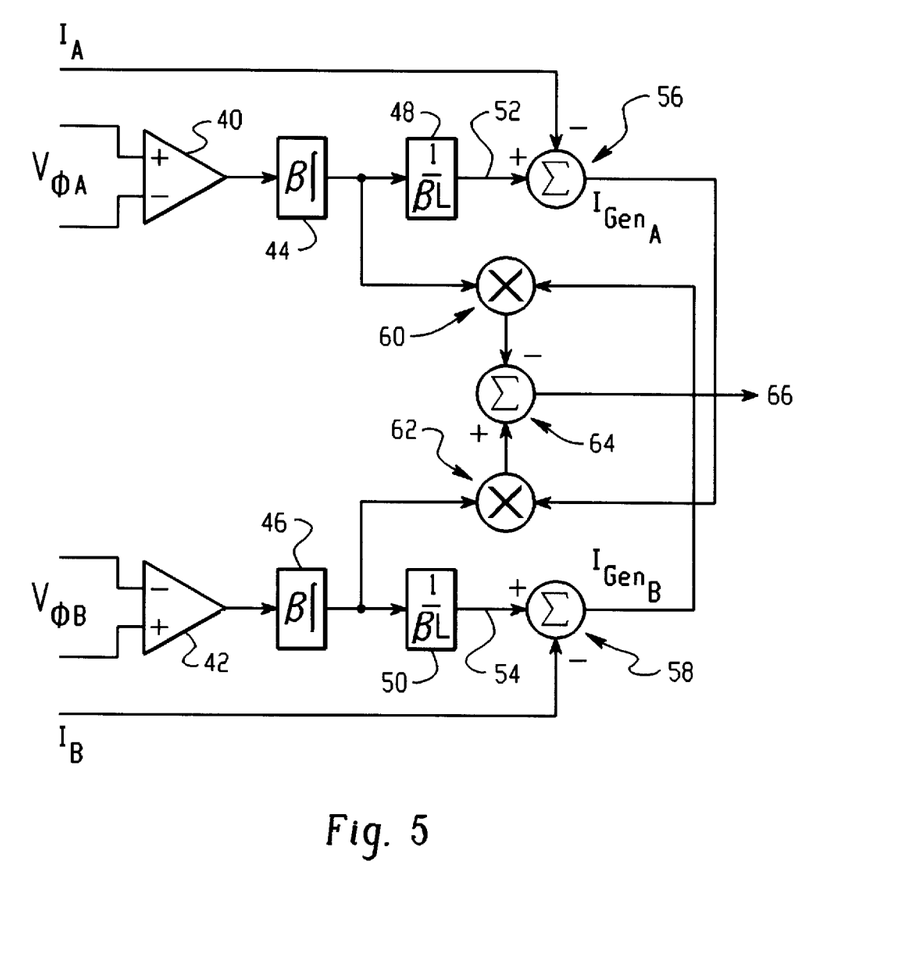
FIG. 5 is a schematic diagram of one embodiment of an observer matrix for electronically producing a torque dependent signal in accordance with the invention.

With reference to FIG. 5, a suitable circuit for implementing the electronic observer is shown in block diagram form.

A differential amplifier 40 is used to detect the phase potentials ($V_{\Phi A}$) for phase A, and another differential amplifier 42 is similarly used for phase B. The phase currents $I_A$ and $I_B$ are detected in a conventional manner such as with a current transformer or other suitable apparatus.

The outputs of the differential amplifiers 40, 42 are fed to respective integrators 44, 46 and then scaled by gain circuits 48, 50. The scaled and integrated phase A, B potentials (outputs 52, 54) are then combined with their respective phase currents $I_A$, $I_B$ using difference circuits 56, 58 to produce signals that correspond to the generator currents of phase A and phase B (Eq. 12). These generator currents ($I_{GenA}$ and $I_{GenB}$) are then multiplied using respective multiplier circuits 60, 62 with the output signals of the integrators 46, 44 respectively. These products are then subtracted from each other using another subtraction circuit 64 to produce a signal 66 that corresponds to the sum of products defined in Eq. 13. The output 66 in this embodiment is referred to herein as the observer output.

It should be noted and appreciated that what is actually measured by the observer of FIG. 5 is phase misalignment between the drive voltages and the corresponding generated EMFs within the motor 30. The use of this information as an analog of acceleration assumes that the motor is required to produce torque to accelerate inertia (J in Eq. 14) and not to overcome friction or an independent torque such as that produced by gravity acting on an elevated load.

In actual step motor systems, the presence of resistive components in the phase windings may produce spurious acceleration indications. Because these spurious outputs from the observer can persist for lengthy intervals, the designer may be prevented from actually integrating the acceleration error. Instead, a designer may choose a filter topology with carefully chosen breakpoints to accomplish the task.

In the embodiment herein, the low-pass section is selected to have a bandwidth of about 130 rad/sec which matches the midrange of break frequencies for step motor windings. That frequency corresponds to motion at approximately 0.5 rps. About two octaves above the break frequency the filter starts to act like a true integrator. At or below this speed the observer reports corrupted information, and the system is no longer useful. Therefore, the feedback path for this particular exemplary embodiment will be interrupted automatically at low speeds.

Having described the basic principles of the present invention including a suitable embodiment, we will now describe how the observer information is incorporated into an overall step motor drive design to effect useful damping of the motor's resonant response.

Viscosity is a linear process whereby a moving member is subjected to a torque that is proportional to its velocity with respect to another member. Consider the block diagram of a step motor in FIG. 6. The instantaneous current vector is a position input r(t) which transforms to R(s). Likewise, the position of the rotor is the output c(t) or C(s). The motor has a stiffness near equilibrium of $$k_e = 50 T_{max} \qquad \text{Eq. 15}$$

Figure 6:
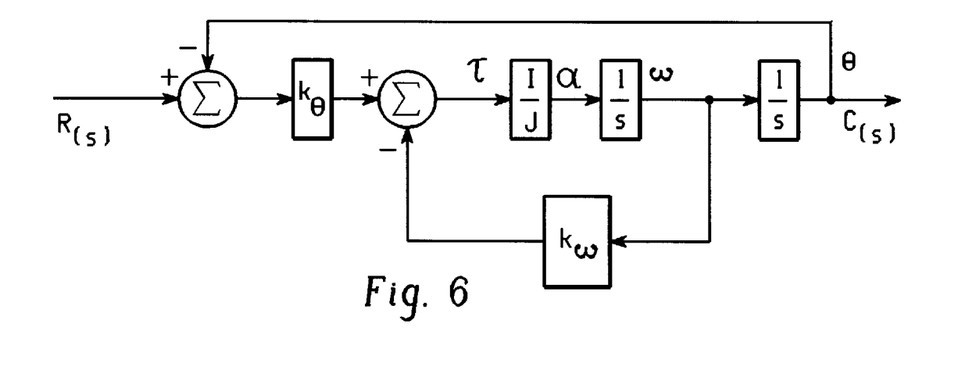
FIGS. 6–14 are additional transfer ratio diagrams illustrating various aspects of a damping technique according to the present invention.

The total system inertia is J. The net torque applied to J produces acceleration, $\alpha$. Acceleration and time integrate to produce velocity, $\omega$. Time and velocity integrate to give position, $\theta$.

Viscous friction with coefficient, $k_\omega$, produces a retarding torque as shown. Using block diagram algebra, the inner loop is absorbed as shown in FIG. 7.

Figure 7:
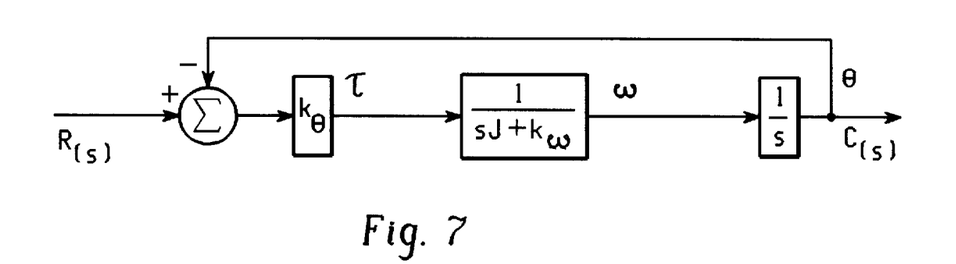
Figure 8:
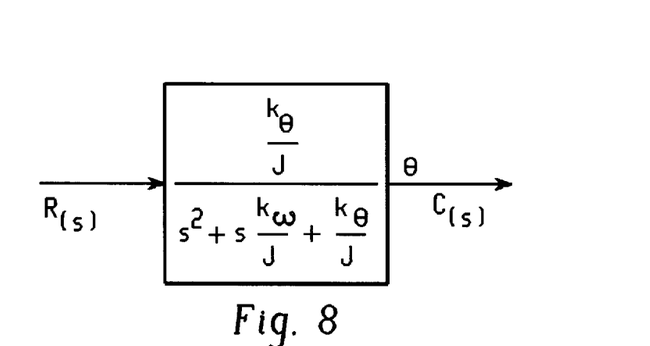

The diagram of FIG. 7 can further be reduced as illustrated in FIG. 8.

The following substitutions will consolidate the transfer function.

$$\omega_n = \sqrt{\frac{k_\theta}{J}} \qquad \zeta = \frac{k_\omega}{2\sqrt{(k_\theta J)}} \qquad \text{Eq. 16}$$

Figure 9:
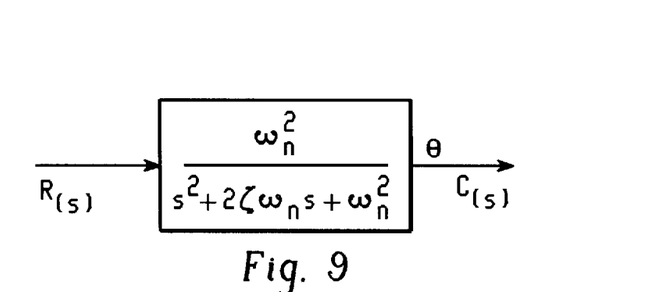

FIG. 9 shows the final result. Viscosity is only a factor in $\zeta$.

The problem with step motors is that $k_\omega$ is very small and hence $\zeta$ is also small. It has been observed as low as 0.01. The active electronic damping system of the present invention raises $\zeta$, for example, to 0.3–0.5. (Note that the friction mechanism depicted in FIG. 6 is actually a form of velocity feedback.)

We will now subject the system in FIG. 6 to a series of transformations using block diagram algebra.

Figure 10:
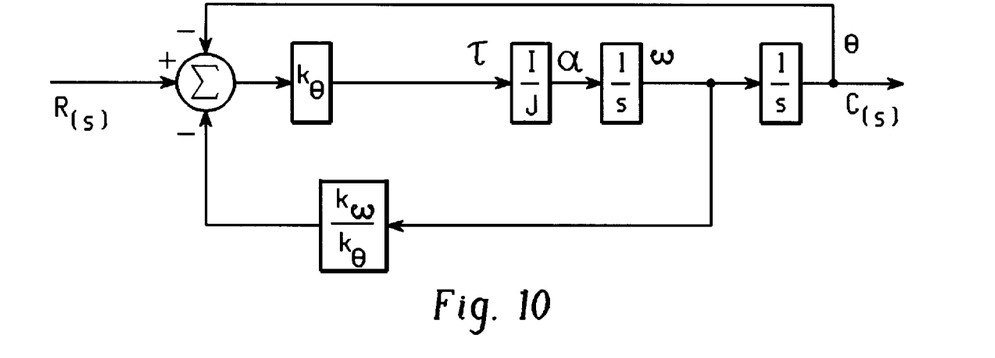

Step 1: Move the summing point ahead of the stiffness block. See FIG. 10.

Step 2: Move the takeoff point ahead of the inertia block as illustrated in FIG. 11.

Figure 11:
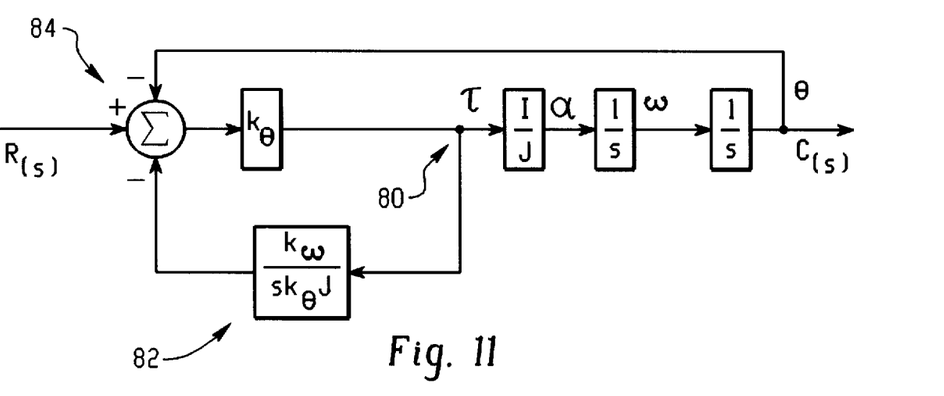

The system in FIG. 11 has the same transfer function as the one with which we started in FIG. 6. It is also in the form employed by the active damping scheme. The observer of FIG. 5 reports (from monitoring point 80) an analog of instantaneous torque utilization which is then scaled and integrated (block 82 in FIG. 11) using a suitable integrator circuit to accomplish $$\frac{k_\omega}{s k_\theta J}$$

before entering the summing node 84 (see U.S. Pat. No. 3,836,835 issued to Sawyer, the entire disclosure of which is fully incorporated herein by reference).

We now rearrange the expression for $\zeta$ from Eq. 16

$$\zeta = \frac{k_\omega}{2\sqrt{(k_\theta J)}} \text{ or } k_\omega = 2\zeta \sqrt{(k_\theta J)} \qquad \text{Eq. 17}$$

From this it is apparent that the amount of viscosity required to effect a given amount of damping ratio is proportional to the square root of both $k_\theta$ and J. Substituting this relation into FIG. 11 results in FIG. 12.

Figure 12:
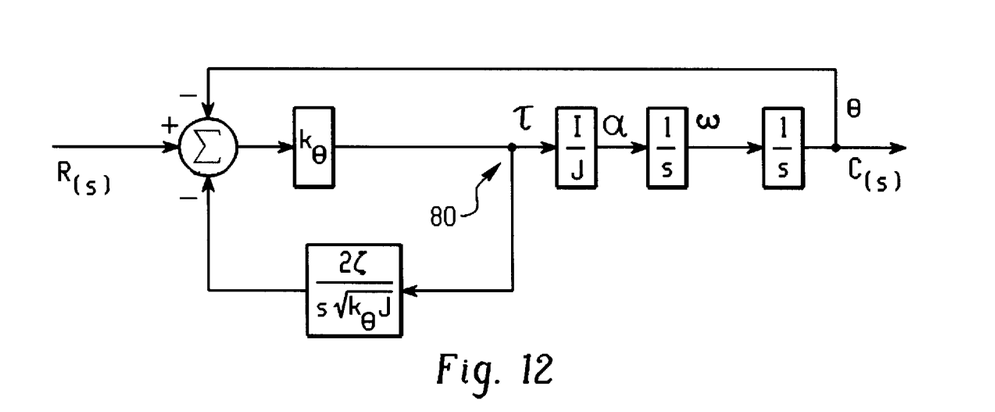

The feedback block in FIG. 12 shows how the output of the observer (FIG. 5, point 66) must be processed (scaled and integrated) to achieve a given damping ratio.

Because the feedback is a signal as opposed to actual, physical friction, the opportunity arises to add velocity feed-forward to the summing node so that the loop acts only upon velocity error and does not incur have following errors in position. To accomplish this, the following operations are performed on the system of FIG. 12.

Step 1: Scale the output of the observer by the factor 1/J and add a factor of J to the integrator. This leaves the state variable, acceleration, available.

Step 2: Subtract the commanded acceleration from the scaled output of the observer prior to the integrator.

Figure 13:
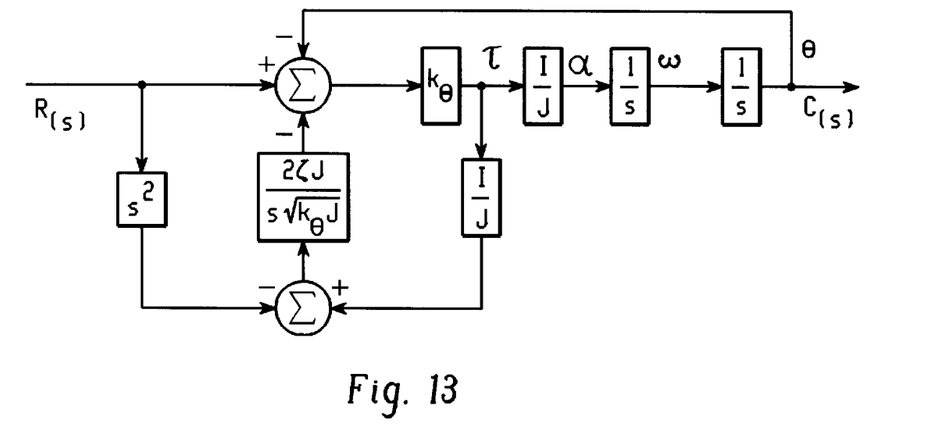

FIG. 13 shows the result. The net feedback has not changed and therefore the damping ratio remains the same. However, now the integrator acts on commanded acceleration as well as feedback to render velocity feed-forward.

Figure 14:
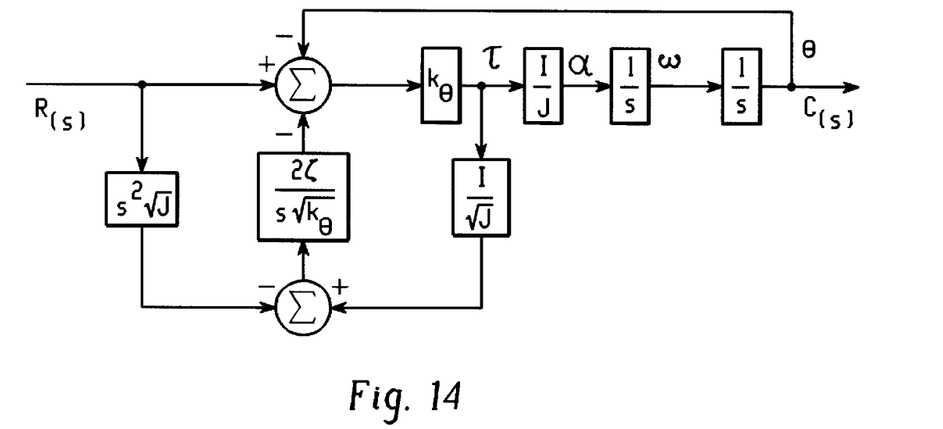

To complete the development, remove a factor of $\sqrt{J}$ from the integrator and place the same factor in the feed-forward and feedback paths. See FIG. 14. This last step serves to reduce the range of adjustment required in scaling the output of the observer to match the commanded acceleration.

The invention thus provides methods and apparatus for damping step motor resonant response using electronic means to provide a torque dependent signal that in turn can be used to provide acceleration and velocity feedback information.

Another embodiment would prescribe the use of a digitally based damping circuit using a form of programmable processor such as, but not limited to, a digital signal processor or RISC based processor. The observer gains could be adjusted real-time to allow for dynamic tailoring of transient response and highly varying load dynamics in order to yield consistent damping over a wide range of inertias and external disturbances. Such a system would also be well suited for self characterization, in which specific loop gains could be adjusted real-time in response to external spurious disturbances (reflected at the observer output) or in accordance with known dynamic system parameters.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A method for electronically producing a torque dependent signal for a plural drive phase synchronous step motor, comprising the steps of:
   a. detecting respective instantaneous terminal voltage signals for two phases of the motor;
   b. detecting respective instantaneous phase current signals for said two phases;
   c. determining respective generator currents for each phase based on said respective instantaneous phase currents and an integration of said respective instantaneous voltage signals; and
   d. combining said generator currents and said integration of said instantaneous voltage signals to produce said torque dependent signal.

2. The method of claim 1 wherein the step of combining said signals further comprises subtracting said instantaneous phase current signal from said integration of said instantaneous voltage signal for each phase to produce said respective generator current.

3. The method of claim 2 wherein said torque dependent signal is determined by a relationship $(I_{GenA}*I_{\Phi B})-(I_{GenB}*I_{\Phi A})$ where $I_{GenA}$ is related to said determined generator current for one of said phases, $I_{GenB}$ is related to said determined generator current for another of said phases, and $I_{\Phi A}$ and $I_{\Phi B}$ are related to said detected phase currents.

4. The method of claim 1 wherein said torque dependent signal is derived from phase misalignment between said detected terminal voltages and corresponding generated EMF signals.

5. The method of claim 1 further comprising the steps of producing an instantaneous acceleration dependent signal based on said torque dependent signal, and combining said instantaneous acceleration dependent signal with a commanded acceleration signal.

6. The method of claim 1 further comprising the step of using said torque dependent signal in a feedback circuit for damping resonant response of the motor.

7. The method of claim 1 wherein said torque dependent signal is scaled and integrated in a feedback circuit to effect a desired damping ratio for the motor.

8. The method of claim 7 wherein said torque dependent signal is scaled to produce an acceleration dependent signal, and further comprising the steps of combining said acceleration dependent signal with a commanded acceleration signal and integrating the resulting combination to effect velocity feed-forward control.

9. Apparatus for electronically producing a torque dependent signal for a plural drive phase synchronous step motor, comprising: means for detecting respective instantaneous terminal voltage signals for two phases of the motor; means for detecting respective instantaneous phase current signals for said two phases; and signal processing means for determining respective generator currents for each phase based on said respective instantaneous phase current signals and an integration of said respective instantaneous voltage signals and for combining said detected integration of said instantaneous voltage signal and said generator currents to produce said torque dependent signal.

10. The apparatus of claim 9 wherein said signal processing means determines respective generator currents for each of said at least two phases based on an integration of the corresponding phase terminal voltage signal and subtracts this value from the respective instantaneous phase current value.

11. The apparatus of claim 9 wherein said torque dependent signal corresponds to phase misalignment between said detected terminal voltages and corresponding generated EMF signals.

12. The apparatus of claim 1 wherein said torque dependent signal is determined by a relationship $(I_{GenA}*I_{\Phi B})-(I_{GenB}*I_{\Phi A})$ where $I_{GenA}$ is related to said determined generator current for one of said phases, $I_{GenB}$ is related to said determined generator current for another of said phases, and $I_{\Phi A}$ and $I_{\Phi B}$ are related to said detected phase currents.

13. The apparatus of claim 9 wherein said detecting means and said signal processing means are integrated with transconductance amplifier means for producing said phase drive currents.

14. The apparatus of claim 9 further comprising means for producing an instantaneous acceleration dependent signal based on said torque dependent signal, and combining said instantaneous acceleration dependent signal with a commanded acceleration signal.

15. The apparatus of claim 9 further comprising feedback means for combining said torque dependent signal with position command signals to damp resonant response of the motor.

16. The apparatus of claim 15 wherein said feedback means scales and integrates said torque dependent signal to effect a desired damping ratio for the motor.

17. The apparatus of claim 16 wherein said feedback means produces an acceleration dependent signal based on said torque dependent signal and combines said acceleration dependent signal with a commanded acceleration signal and integrates the resulting combination to effect velocity feed-forward control.

18. Apparatus for active electronic damping in a plural drive phase step motor, comprising: means for detecting respective instantaneous terminal voltage signals for two phases of the motor; means for detecting respective instantaneous phase current signals for said two phases; means for determining respective generator currents for each phase based on said respective instantaneous phase current signals and an integration of said respective instantaneous voltage signals and for combining said detected signals to produce a torque dependent signal; and feedback means for effecting a desired damping ratio based on said torque dependent signal.

19. The apparatus of claim 18 wherein said first and second stated detecting means operate as an electronic observer means for determining a torque dependent signal used in a feedback circuit to damp resonant response of the motor.

20. The apparatus of claim 19 wherein said observer means produces an output that can be scaled to provide motor acceleration and velocity information independent of an accelerometer or other external feedback device.

* * * * *

UNITED STATES PATENT AND TRADEMARK OFFICE
CERTIFICATE OF CORRECTION

PATENT NO. : 5,847,535
DATED : December 8, 1998
INVENTOR(S) : Nordquist et al.

It is certified that error appears in the above-identified patent and that said Letters Patent is hereby corrected as shown below:

Column 4, line 64, delete [nieces] and insert --pieces--

Column 5, line 6, Omega Symbol $W_3$ should be --$W_e$--.

Column 8, line 53, delete [have] and insert --huge--

Column 10, Claim 12, should depend from Claim 11, not from Claim 1.

Signed and Sealed this

Fifteenth Day of June, 1999

Attest:

Q. TODD DICKINSON

Attesting Officer

Acting Commissioner of Patents and Trademarks